(12) United States Patent
Meng et al.

(10) Patent No.: US 12,363,810 B2
(45) Date of Patent: Jul. 15, 2025

(54) MINI-DIODE LAMP BOARD AND LIGHT-EMITTING DEVICE

(71) Applicant: BOE TECHNOLOGY GROUP CO., LTD., Beijing (CN)

(72) Inventors: Zhaohui Meng, Beijing (CN); Lin Cong, Beijing (CN); Yilin Feng, Beijing (CN); Xin Duan, Beijing (CN); Ying Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/028,823

(22) PCT Filed: Apr. 28, 2022

(86) PCT No.: PCT/CN2022/089828
§ 371 (c)(1),
(2) Date: Mar. 28, 2023

(87) PCT Pub. No.: WO2023/206221
PCT Pub. Date: Nov. 2, 2023

(65) Prior Publication Data
US 2024/0365452 A1    Oct. 31, 2024

(51) Int. Cl.
*H05B 45/44* (2020.01)
(52) U.S. Cl.
CPC .................................. *H05B 45/44* (2020.01)
(58) Field of Classification Search
CPC .............................. H05B 45/44; G02F 1/1336
USPC ....................................................... 315/295
See application file for complete search history.

(56) References Cited

U.S. PATENT DOCUMENTS

| | | | |
|---|---|---|---|
| 2012/0146520 A1 | 6/2012 | Liu et al. | |
| 2021/0066259 A1 | 3/2021 | Wang et al. | |
| 2021/0151424 A1* | 5/2021 | Do | H01L 33/38 |
| 2021/0167055 A1* | 6/2021 | Kang | H01L 25/167 |
| 2021/0389635 A1* | 12/2021 | Wang | G02F 1/136286 |
| 2021/0391312 A1* | 12/2021 | Luo | G09G 3/32 |
| 2022/0068998 A1* | 3/2022 | Luo | H01L 33/62 |

(Continued)

FOREIGN PATENT DOCUMENTS

| | | |
|---|---|---|
| CN | 101345089 A | 1/2009 |
| CN | 102214432 B | 6/2013 |

(Continued)

*Primary Examiner* — Ryan Jager
(74) *Attorney, Agent, or Firm* — WHDA, LLP

(57) ABSTRACT

Mini-diode lamp board and light-emitting device are provided. The board includes a substrate, luminance signal lines arranged in a first direction and extending in a second direction, and control signal lines arranged in the second direction and extending in the first direction. The board has sub-regions each including a drive chip and a LED lamp group; drive chips corresponding to a row of sub-regions arranged in the first direction are electrically connected to the same control signal line; drive chips corresponding to a column of sub-regions arranged in the second direction are electrically connected to the same luminance signal line; and the drive chip obtains a luminance signal provided by the luminance signal line under the control of a control signal provided by the control signal line, and controls a corresponding LED lamp group to emit light according to the luminance signal.

20 Claims, 2 Drawing Sheets

(56) References Cited

U.S. PATENT DOCUMENTS

2022/0309996 A1* 9/2022 Huang ................. G09G 3/2088
2022/0319452 A1   10/2022 Yang et al.
2023/0030891 A1    2/2023 Du et al.

FOREIGN PATENT DOCUMENTS

| CN | 103886826 A |   | 6/2014  |
|----|-------------|---|---------|
| CN | 107657900 A | * | 2/2018  |
| CN | 110164326 A |   | 8/2019  |
| CN | 111651087 A |   | 9/2020  |
| CN | 111913323 A |   | 11/2020 |
| CN | 112820237 A |   | 5/2021  |
| CN | 113748453 A |   | 12/2021 |
| CN | 114255704 A |   | 3/2022  |
| JP | 2004-212747 A |   | 7/2004  |

* cited by examiner

MINI-DIODE LAMP BOARD AND LIGHT-EMITTING DEVICE

CROSS-REFERENCE TO RELATED APPLICATIONS

The present application is the U.S. national phase of PCT Application No. PCT/CN2022/089828 filed on Apr. 28, 2022, the disclosure of which is hereby incorporated by reference in its entirety.

TECHNICAL FIELD

Embodiments of the present disclosure relate to the technical field of light-emitting devices, and more particularly, to a mini-diode lamp board and a light-emitting device.

BACKGROUND

The mini-diode light-emitting device refers to a light-emitting device using a LED (light-emitting diode) chip in an order of 100 microns as a light-emitting unit, and the Mini LED has advantages such high adaptation speed, low power consumption and long service life.

SUMMARY

Embodiments of the present disclosure provide a mini-diode lamp board and a light-emitting device.

In a first aspect, embodiments of the present disclosure provide a mini-diode lamp board, the mini-diode lamp board includes a substrate, a plurality of luminance signal lines on the substrate and a plurality of control signal lines on the substrate, where the plurality of luminance signal lines is arranged in a first direction and extends in a second direction, and the plurality of control signal lines arranged in the second direction and extends in the first direction.

The mini-diode lamp board includes a plurality of sub-regions, and at least one of the plurality of sub-regions includes a drive chip and a light-emitting diode (LED) lamp group.

Drive chips corresponding to a row of sub-regions which are arranged in the first direction are all electrically connected to the same control signal line, and drive chips corresponding to a column of sub-regions which are arranged in the second direction are all electrically connected to the same luminance signal line; where the drive chip is configured to obtain a luminance signal provided by the luminance signal line under the control of a control signal provided by the control signal line, and to control a corresponding LED lamp group to emit light according to the luminance signal.

In some embodiments, at least one LED lamp groups include one LED lamp bead or N LED lamp beads connected in series, a first terminal of the LED lamp group is electrically connected to a corresponding drive chip, a second terminal of the LED lamp group is connected to a common power line, where N is an integer greater than 1.

In some embodiments, at least one of the plurality of sub-regions includes M LED lamp groups, and the drive chip includes M control signal channels corresponding to the M LED lamp groups.

The M control signal channels of the same drive chip correspond to the same luminance signal line, the M control signal channels of the same drive chip correspond to different control signal lines, respectively, where M is a positive integer.

In some embodiments, m-th signal channels, in the drive chips corresponding to the row of sub-regions arranged in the first direction, correspond to the same control signal line, where m is a positive integer less than or equal to M.

In some embodiments, the control signal channel includes an AND gate circuit, input terminals of the AND gate circuit are connected to the control signal line and the luminance signal line, respectively, and an output terminal of the AND gate circuit is connected to a corresponding LED lamp group.

In some embodiments, the drive chip includes a digital-to-analog conversion module, the digital-to-analog conversion module is arranged between an end of the drive chip connecting to a corresponding luminance signal line and the input terminal of the AND gate circuit, and the digital-to-analog conversion module is configured to convert a luminance signal in a digital format inputted to the drive chip into a luminance signal in an analog format.

In some embodiments, an orthographic projection of the common power line onto the substrate and an orthographic projection of the control signal line onto the substrate do not overlap.

In some embodiments, the common power line includes a first sub-power line, a second sub-power line, and a common power bus.

The first sub-power line extends in the second direction, and second terminals of LED lamp groups corresponding to the same sub-region are connected to the same first sub-power line.

The second sub-power line extends in the first direction, and first sub-power lines for the row of sub-regions arranged in the first direction are connected to the same second sub-power line.

The common power bus extends in the second direction, and each second sub-power line is connected to the common power bus.

In some embodiments, the second sub-power line is in bridge connection to corresponding portions of different sub-regions through the drive chip.

In some embodiments, the control signal line and the second sub-power line, which are corresponding to at least one of the plurality of sub-regions, are disposed at two opposite sides of the sub-region in the second direction, respectively.

In some embodiments, an orthographic projection of the common power line onto the substrate and an orthographic projection of the luminance signal line onto the substrate do not overlap in regions other than an orthographic projection of the drive chip on the substrate.

In some embodiments, an orthographic projection of the luminance signal line onto the substrate and an orthographic projection of the control signal line onto the substrate do not overlap in regions other than an orthographic projection of the drive chip on the substrate.

In some embodiments, the luminance signal line has a bridge connection through the drive chip at a region corresponding to the drive chip.

In a second aspect, embodiments of the present disclosure provide a light-emitting device, including the mini-diode lamp board in the first aspect.

BRIEF DESCRIPTION OF THE DRAWINGS

In order to give a clear illustration for the technical solution provided by embodiments of the present disclosure, a brief description will be given hereinafter in conjunction with the accompanying drawings to be used in the description of the embodiments of the present disclosure. Apparently, these drawings are only some embodiments of the present disclosure, and other drawings can be obtained from these drawings by a person skilled in the art without involving any inventive effort.

DETAILED DESCRIPTION

The technical solution provided by the embodiments of the present disclosure will be clearly described below in conjunction with the accompanying drawings for the embodiments of the present disclosure, and apparently, the embodiments described hereinafter are some, rather than all, of the embodiments of the present disclosure. Based on the embodiments in the disclosure, all other embodiments obtained by a person of ordinary skill in the art without creative efforts fall within the protection scope of the disclosure.

The terms "first", "second", and the like in the embodiments are used for distinguishing similar objects and not necessarily for describing a particular sequential or chronological order. Moreover, the terms "comprise" and "include", and any variation thereof, are intended to cover a non-exclusive inclusion, such that a process, method, system, article, or apparatus that includes a list of steps or elements is not necessarily limited to those steps or elements expressly listed, but may include other steps or elements not expressly listed or inherent to such process, method, article, or apparatus. Furthermore, the use of "and/or" in the application means that at least one of the referred objects, such as A and/or B and/or C, means that seven instances including single A, or single B, or single C, or both A and B, or both B and C, or both A and C, or all of A, B and C.

Embodiments of the present disclosure provide a mini-diode (LED) lamp board.

In this embodiment, the type of the diode is not particularly limited. For example, a LED having a quantum well junction, a LED having a columnar structure, a LED having a double heterojunction, or the like may be used.

In some embodiments, the mini-diode may have a structure scaled down to a size in an order of a hundred of microns (μm), for example, an area of a light-emitting region of the light-emitting diode is preferably 1 mm$^2$ or less, more preferably 10000 μm$^2$ or less, still more preferably 3000 μm$^2$ or less, particular preferably 700 μm$^2$ or less, and may even be 200 μm$^2$ or less. A distance between adjacent LED lamp beads is at least 2.5 mm (millimeter) or less, and in some embodiments, the distance between LED lamp beads is 1 mm or less, more preferably 0.5 mm or less, still more preferably 0.3 mm or less.

Figure 1:
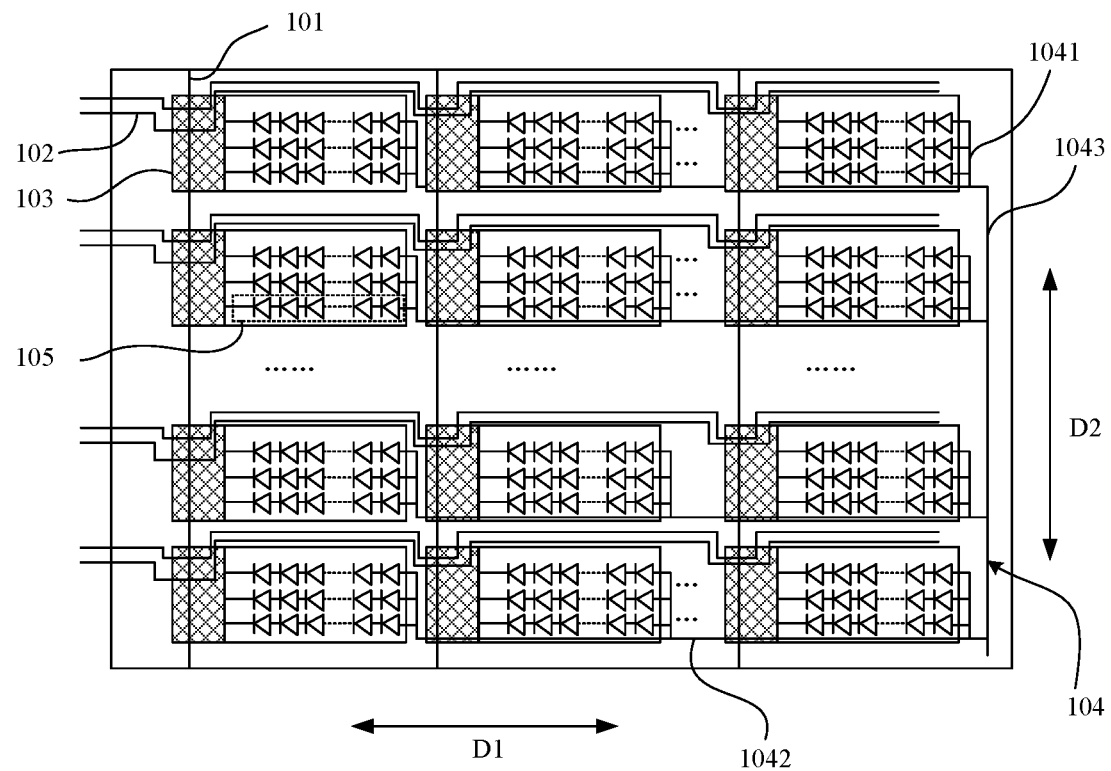
FIG. 1 is a schematic structural diagram of a lamp board in an embodiment of the present disclosure.
Figure 2:
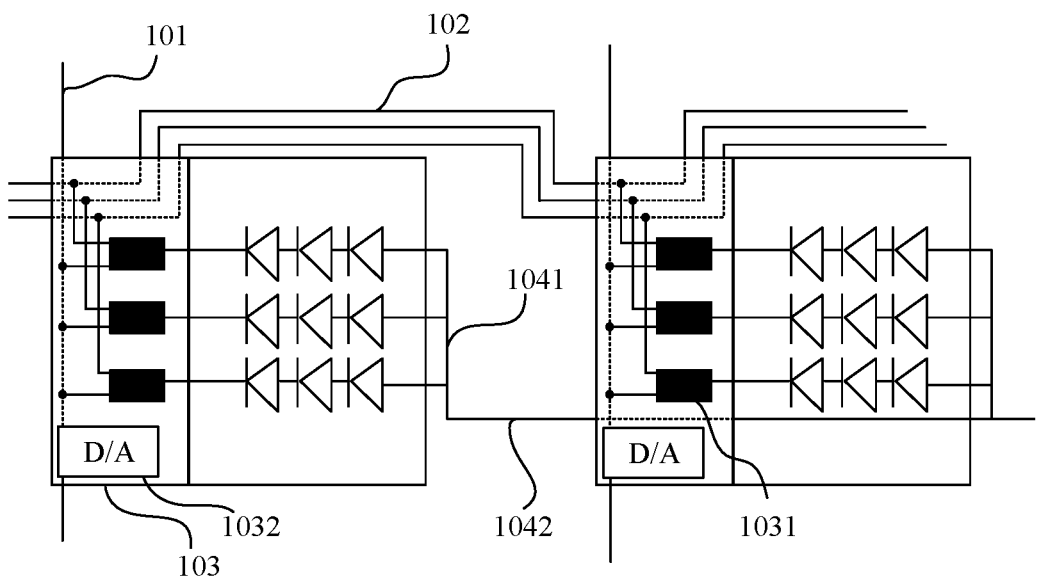
FIG. 2 is another schematic structural diagram of a lamp board in an embodiment of the present disclosure.

As shown in FIGS. 1 and 2, in one embodiment, the mini-diode lamp board includes a substrate, a plurality of luminance signal lines 101 on the substrate and a plurality of control signal lines 102 on the substrate, where the plurality of luminance signal lines 101 is distributed along a first direction D1 and extends in a second direction D2, and the plurality of control signal lines 102 is distributed along the second direction D2 and extends in the first direction D1.

In an exemplary embodiment, specifically, the first direction D1 is the row direction, or transverse direction, of the lamp board shown in FIG. 1, and the second direction D2 is the column direction, or longitudinal direction, of the lamp board shown in FIG. 1.

It is to be understood that, in embodiments, the first direction D1 and the second direction D2 may be adjusted according to actual needs, the first direction D1 and the second direction D2 may intersect with each other, not necessarily perpendicular to each other as shown, and this not further limited herein.

In the embodiment, the mini-diode lamp board has a plurality of sub-regions.

In an embodiment, the plurality of sub-regions is arranged in an array in order to increase the area of the active area of the light-emitting region of the lamp board. Specifically, in this embodiment, a total of A*B sub-regions in A rows and B columns are included, A and B are both positive integers, and at least one sub-region includes a drive chip 103 and a LED lamp group 105 corresponding to the sub-region.

In other embodiments, it will be apparent that the position of the sub-region may be arranged according to the actual need. Illustratively, the sub-regions may be adjoined with each other or spaced apart. The sub-regions may be spliced into a rectangular shape, may be spliced into a circular, triangular or specific pattern and the like as desired, which is not further limited herein.

At least one sub-region includes the drive chip 103 and the LED lamp group 105, and in practice, in each sub-region, the LED lamp group 105 is controlled by the drive chip 103 in the sub-region so as to realize light-emitting control for the sub-region.

Drive chips 103 corresponding to a row of sub-regions arranged along the first direction D1 are all electrically connected to the same control signal line 102, and drive chips 103 corresponding to a column of sub-regions arranged along the second direction D2 are all electrically connected to the same luminance signal line 101.

In other words, each of the sub-regions in the same row corresponds to the same control signal line 102 and each of the sub-regions in the same column corresponds to the same luminance signal line 101.

The drive chip 103 is configured to obtain a luminance signal provided by the luminance signal line 101 under the control of a control signal provided by the control signal line 102, and then control a corresponding LED lamp group 105 to emit light according to the luminance signal.

In the embodiment, the control signal is provided via the control signal line 102, and the luminance signal is provided via the luminance signal line 101, and after obtaining the control signal and the luminance signal, the drive chip 103 controls the corresponding LED lamp group 105 to emit light according to the control signal and the luminance signal.

In the embodiment, by providing the control signal lines 102 and the luminance signal lines 101, signals can be provided to each drive chip 103 in each sub-region through the control signal lines 102 and the luminance signal lines 101, so as to control each LED lamp group 105 in each sub-region to emit light, thereby improving the control for the light-emitting of the lamp board.

In some embodiments, at least one LED lamp group 105 includes one LED lamp bead or N LED lamp beads connected in series, a first terminal of the LED lamp group 105 is electrically connected to a corresponding drive chip 103, a second terminal of the LED lamp group 105 is connected to a common power line 104, and N is an integer greater than 1.

As shown in FIG. 2, in this embodiment, exemplarily, the LED lamp group 105 includes three LED lamp beads.

In some embodiments, in general, LED lamp beads in each LED lamp group 105 are the same. Specifically, the color of emitted light as well as various electrical parameters for these LED lamp beads are the same.

In some embodiments, the first terminal of the LED lamp group 105 corresponds to an anode of a LED lamp bead and a second terminal of the LED lamp group 105 corresponds to a cathode of the LED lamp bead.

In some other embodiments, the LED lamp beads in each LED lamp group 105 may be different LED lamp beads.

It should be understood that, in a case where each LED lamp group 105 includes a plurality of LED lamp beads, since each LED lamp group 105 emits light under the control of the same control signal and luminance signal for the corresponding drive chip 103, the luminous effect of each of the LED lamp beads in each LED lamp group 105 may be the same if other conditions (such as the performance of each LED lamp bead) are the same.

In some embodiments, each sub-region includes M LED lamp groups 105 and the drive chip 103 includes M control signal channels 1031 corresponding to the M LED lamp groups 105, respectively.

As shown in FIG. 2, in the embodiment, M=3 is taken as an example.

M signal channels 1031 of the same drive chip 103 all correspond to the same luminance signal line 101, M signal channels 1031 of the same drive chip 103 correspond to different control signal lines 102, and M is a positive integer.

In the solution of this embodiment, each sub-region may include only one LED lamp group 105 or may include a plurality of LED lamp groups 105.

In the case where one sub-region includes a plurality of LED lamp groups 105, the LED lamp groups 105 are respectively connected to different signal channels 1031, and accordingly, the signal channels 1031 corresponds to different control signal lines 102, respectively, so as to realize independent driving for each LED lamp group 105.

In the embodiment, each signal channel 1031 may be understood to be a series of signal processing circuits that generate, based on the control signal provided by control signal line 102 and the luminance signal provided by luminance signal line 101, a light-emitting control signal for controlling a respective LED lamp group 105.

In some embodiments, each m-th signal channel 1031 in each of drive chips 103 corresponding to a row of sub-regions which are arranged along the first direction D1 corresponds to the same control signal line 102, and m is a positive integer less than or equal to M.

In one exemplary embodiment, M is 5, and each drive chip 103 includes 5 signal channels 1031 and each sub-region includes 5 LED lamp groups 105. For the same row of sub-regions, a first signal channel in five signal channels 1031 for the drive chip 103 of each of these sub-regions is connected to the same control signal line 102, a second signal channel in the five signal channels 1031 is connected to the same control signal line 102. The same applies to the remaining signal channels.

It should be appreciated that signal channels 1031 corresponding to LED lamp groups 105 in the same row are connected to the same control signal line 102.

Figure 3:
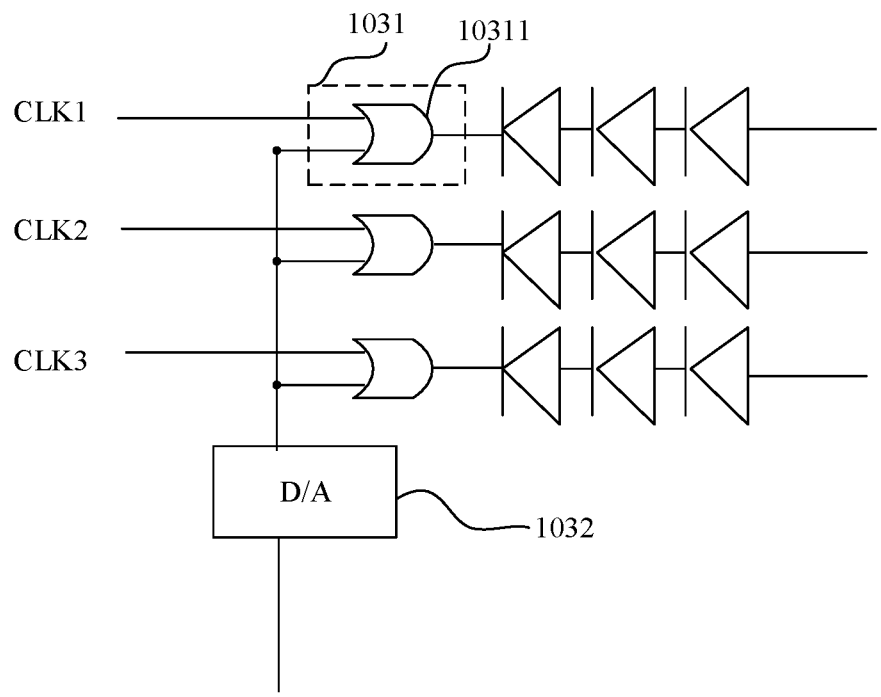
FIG. 3 is a schematic diagram showing principle of a drive circuit in an embodiment of the present disclosure.

As shown in FIG. 3, in some embodiments, the control signal channel 1031 includes an AND gate circuit 10311, input terminals of the AND gate circuit 10311 are respectively connected to control signal line 102 and luminance signal line 101, and an output terminal of the AND gate circuit 10311 are connected to a corresponding LED lamp group 105.

Figure 4:
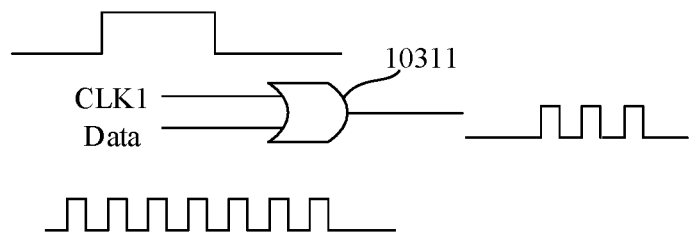
FIG. 4 is a schematic diagram showing a light-emitting control signal generation in an embodiment of the present disclosure.

As shown in FIGS. 3 and 4, in this embodiment, the control signal line 102 provides a clock signal CLK corresponding to each row of the LED lamp groups 105 as a control signal. In the exemplary embodiment shown in FIG. 3, the clock signal specifically includes CLK1 to CLK3.

As shown in FIG. 4, the luminance signal line 101 provides a luminance signal. As shown in FIG. 4, in this embodiment, the control signal is CLK1 and the luminance signal is Data. Based on the AND gate circuit 10311, An AND result of CLK1 and Data may be obtained as a light-emitting control signal, and the LED lamp group 105 corresponding to CLK1 is controlled to emit light based on the light-emitting control signal.

Figure 5:
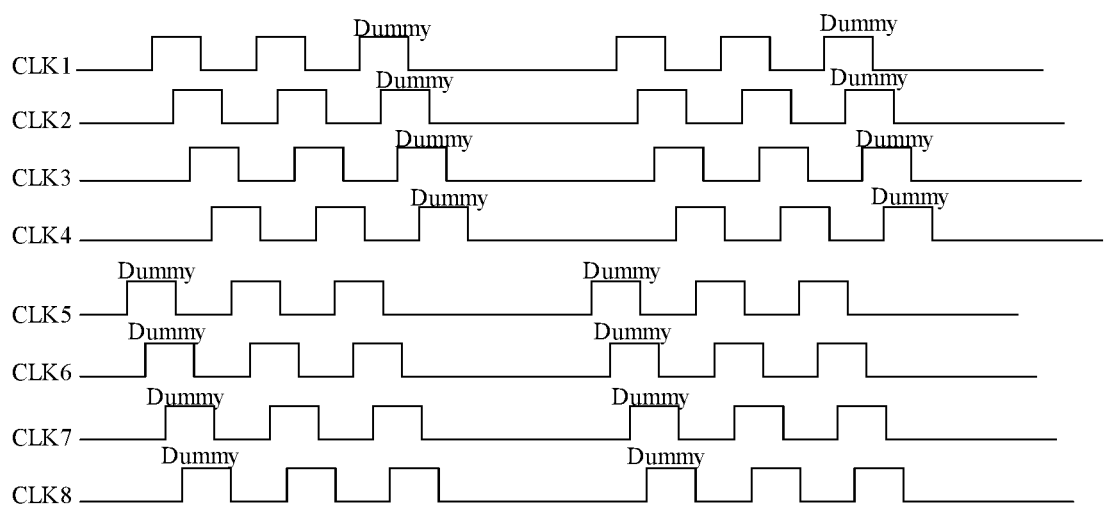
FIG. 5 a schematic timing diagram of a control signal in an embodiment of the present disclosure.

As shown in FIG. 5, for each of rows of LED lamp groups 105, control signals (CLK1 to CLK8, etc.) with a corresponding timing sequence are provided, and in combination with a corresponding luminance signal, a light-emitting control for each of rows of LED lamp groups 105 can be realized.

Here, a dummy signal (Dummy) is used to adjust the charging time so as to improve the luminous effect.

Here, the structure of the AND gate circuit 10311 itself may be referred to the related art and thus is not further defined and described herein.

It will be understood that the control signal functions as a switch as to whether the luminance signal is inputted or not. For the luminance signal, brightness adjustment can be achieved by adjusting a duty cycle of the inputted luminance signal. As a result, a brightness adjustment and switching control for each LED lamp group 105 can be achieved.

As shown in FIGS. 2 and 3, in some embodiments, the drive chip 103 includes a digital-to-analog conversion module (D/A) 1032 arranged between an end of the drive chip 103 connecting to a corresponding luminance signal line 101 and the input terminal of the AND gate circuit 10311.

In the technical solution of this embodiment, the digital-to-analog conversion module 1032 is provided in each drive chip 103, and the digital-to-analog conversion module 1032 is configured to convert a luminance signal in a digital format, which is inputted via the luminance signal line 101 to the drive chip 103, into a luminance signal in an analog format, for the subsequent light-emitting control signal generation based on the AND gate circuit 10311.

In implementation, the luminance signal is input in a serial signal format, and the digital-to-analog conversion module 1032 may extract, based on the principles of the cascaded signal and time division multiplexing, the luminance signal in the digital format corresponding to the drive chip 103 in which the module 1032 is included, and convert the extracted signal into an analog signal.

In the embodiment, the position and arrangement of tracks may be further adjusted, so as to reduce regions in the aperture area occupied by those tracks and improve the aperture ratio of the lamp board.

In some embodiments, an orthographic projection of the common power line 104 onto the substrate and an orthographic projection of the control signal line 102 onto the substrate do not overlap.

As shown in FIGS. 1 and 2, in some embodiments, the common power line 104 includes a first sub-power line 1041, a second sub-power line 1042, and a common power bus 1043.

In this embodiment, the first sub-power line 1041 refers to a portion where the common power line 104 is directly connected to the second terminal of each LED lamp group 105. In this embodiment, the first sub-power line 1041 is provided at the second terminal of each LED lamp group 105 in each sub-region, the first sub-power line 1041 extends in the second direction D2, and the second terminals of LED lamp groups 105 corresponding to the same sub-region are connected to the same first sub-power line 1041.

The first sub-power line 1041 refers to a portion of the common power line 104 corresponding to the same row of sub-regions, and the second sub-power line 1042 extends in the first direction D1, and in other words, in the row direction for arranging each row of sub-regions, first sub-power lines 1041 for a row of sub-regions arranged in the first direction D1 is connected to the same second sub-power line 1042. That is, first sub-power lines 1041 for each of rows of sub-regions is connected to the same second power line.

The common power bus 1043 extends in the second direction D2, and each of the second sub-power lines 1042 is connected to the common power bus 1043.

In some embodiments, the control signal line 102 and the second sub-power line 1042 corresponding to each sub-region are disposed on opposite sides of the sub-region in the second direction D2, respectively.

As shown in FIG. 1, the first sub-signal line is distributed at a position between two adjacent sub-regions and its extension only matches an area for arranging the LED lamp groups 105, so that the first sub-signal line does not intersect with the control signal line 102.

The routing position for the control signal line 102 corresponding to each sub-region is on top of said sub-region (in the orientation as shown in FIGS. 1 and 2), and the second sub-power line 1042 is arranged on the bottom of said sub-region (in the orientation as shown in FIGS. 1 and 2), so that the second sub-power signal line does not intersect with the control signal line 102.

In a region corresponding to the common power bus 1043, there is no need to arrange the control signal line 102, so that the common power line 104 and the control signal line 102 do not intersect at each of various positions.

In some embodiments, an orthographic projection of the common power line 104 onto the substrate and an orthographic projection of the luminance signal line 101 onto the substrate do not overlap in regions other than an orthographic projection of the drive chip 103 onto the substrate.

In some embodiments, the orthographic projection of the luminance signal line 101 onto the substrate and the orthographic projection of the control signal line 102 onto the substrate do not overlap in regions other than the orthographic projection of the drive chip 103 onto the substrate.

In some embodiments, the luminance signal line 101 has a bridge connection through the drive chip 103 at a region corresponding to the drive chip 103.

It should be noted that extending directions of the common power line 104 (in particular, the second sub-power line 1042 of the common power line 104) and the luminance signal line 101 are different, the extending directions of the second sub-power line 1042 and the luminance signal line 101 are intersected, so that a crossing region may exist between the second sub-power line 1042 and the luminance signal line 101.

In the embodiment, in regions other than the orthographic projection of the drive chip 103 onto the substrate, the orthographic projection of the common power line 104 onto the substrate and the orthographic projection of the luminance signal line 101 onto the substrate do not overlap, that is, the overlapping region where the second sub-power line 1042 and the luminance signal line 101 overlaps is located in the region corresponding to the drive chip 103.

In some of these embodiments, the second sub-power line 1042 and corresponding portions of different sub-regions are in bridge connections through the drive chip 103.

Further, in some embodiments, in the region corresponding to the drive chip 103, the control signal line 102 may also be connected in the form of bridge connection.

It will be appreciated that bridge connection relationships for tracks in the drive chip 103 are denoted as dotted lines in FIG. 2, and it will be appreciated that the dotted lines in FIG. 2 merely represent electrical connections of the tracks and do not represent actual positions and arrangements for the tracks.

In implementation, each of the above-mentioned tracks (for example, including a common power line 104, a luminance signal line 101 and a control signal line 102) can be formed in a corresponding region of the drive chip 103, and then the bridge connection for each of the tracks may be realized by connecting corresponding pins of the drive chip 103 to the tracks.

As shown in FIG. 2, it can be understood that each second sub-power line is continuously electrically conductive, but each second sub-power line itself is not continuous in structure. The second sub-power line is in bridge connection through the drive chip 103 in a region corresponding to each drive chip.

Similarly, the luminance signal line 101 is also in bridge connection through the drive chip 103 in the region corresponding to each drive chip 103.

In the embodiment, the bridge connection means that an electrical connection between two structures is realized by a circuit structure in the drive chip 103.

By using bridge connections for electrical connections of various tracks in the region corresponding to the drive chip 103, an intersecting area between various tracks can be avoided, thereby reducing provision of via holes, jumpers and the like required for such tracks. This is favorable for increasing the active area of the light-emitting region of the lamp board. Further, since there is no intersection between the tracks, the tracks can be formed in the same layer, which can reduce steps in the manufacturing process and manufacturing costs.

Embodiments of the present disclosure provide a light-emitting device, including the mini-diode lamp board described as above. Since the light-emitting device in the embodiment includes all the technical solution of the mini-diode lamp board according to the above embodiments, the light-emitting device can at least achieve all the above-mentioned technical effects, which will not be described in details herein.

It is to be understood that the mini-diode lamp board in the embodiments can be applied to displaying as well as illumination. More specifically, the light-emitting device can be a display device, and accordingly, the mini-diode lamp board may function as a backlight module or directly as a display panel, and the light-emitting device can also be an illumination device.

While the foregoing is directed to example embodiments of the present disclosure, it should be noted that various improvements and modifications can be made by those skilled in the art without departing from the principles described in this disclosure, and these improvements and modifications fall within the protection scope of this disclosure.

What is claimed is:

1. A mini-diode light-emitting board, comprising: a substrate, a plurality of luminance signal lines on the substrate and a plurality of control signal lines on the substrate, wherein the plurality of luminance signal lines is arranged in a first direction and extends in a second direction, and the plurality of control signal lines arranged in the second direction and extends in the first direction;
   wherein the mini-diode light-emitting board comprises a plurality of sub-regions, and at least one of the plurality of sub-regions comprises a drive chip and a light-emitting diode (LED) light-emitting group;
   drive chips corresponding to a row of sub-regions which are arranged in the first direction are all electrically connected to the same control signal line, and drive chips corresponding to a column of sub-regions which are arranged in the second direction are all electrically connected to the same luminance signal line; wherein the drive chip is configured to obtain a luminance signal provided by the luminance signal line under the control of a control signal provided by the control signal line, and to control a corresponding LED light-emitting group to emit light according to the luminance signal;
   wherein at least one of the plurality of sub-regions comprises M LED light-emitting groups, and the drive chip comprises M control signal channels corresponding to the M LED light-emitting groups;
   the M control signal channels of the same drive chip correspond to the same luminance signal line, the M control signal channels of the same drive chip correspond to different control signal lines, respectively, wherein M is a positive integer;
   wherein the control signal channel comprises an AND gate circuit, input terminals of the AND gate circuit are connected to the control signal line and the luminance signal line, respectively, and an output terminal of the AND gate circuit is connected to a corresponding LED light-emitting group.

2. The mini-diode light-emitting board according to claim 1, wherein at least one LED light-emitting groups comprise one LED or N LED connected in series, a first terminal of the LED light-emitting group is electrically connected to a corresponding drive chip, a second terminal of the LED light-emitting group is connected to a common power line, wherein N is an integer greater than 1.

3. The mini-diode light-emitting board according to claim 2, wherein an orthographic projection of the common power line onto the substrate and an orthographic projection of the control signal line onto the substrate do not overlap.

4. The mini-diode light-emitting board according to claim 3, wherein the common power line comprises a first sub-power line, a second sub-power line, and a common power bus; wherein,
   the first sub-power line extends in the second direction, and second terminals of LED light-emitting groups corresponding to the same sub-region are connected to the same first sub-power line;
   the second sub-power line extends in the first direction, and first sub-power lines for the row of sub-regions arranged in the first direction are connected to the same second sub-power line; and
   the common power bus extends in the second direction, and each second sub-power line is connected to the common power bus.

5. The mini-diode light-emitting board according to claim 4, wherein the second sub-power line is in bridge connection to corresponding portions of different sub-regions through the drive chip.

6. The mini-diode light-emitting board according to claim 4, wherein the control signal line and the second sub-power line, which are corresponding to at least one of the plurality of sub-regions, are disposed at two opposite sides of the sub-region in the second direction, respectively.

7. The mini-diode light-emitting board according to claim 2, wherein an orthographic projection of the common power line onto the substrate and an orthographic projection of the luminance signal line onto the substrate do not overlap in regions other than an orthographic projection of the drive chip onto the substrate.

8. The mini-diode light-emitting board according to claim 1, wherein m-th signal channels, in the drive chips corresponding to the row of sub-regions arranged in the first direction, correspond to the same control signal line, wherein m is a positive integer less than or equal to M.

9. The mini-diode light-emitting board according to claim 1, wherein the drive chip comprises a digital-to-analog conversion module, the digital-to-analog conversion module is arranged between an end of the drive chip connecting to a corresponding luminance signal line and the input terminal of the AND gate circuit, and the digital-to-analog conversion module is configured to convert a luminance signal in a digital format inputted to the drive chip into a luminance signal in an analog format.

10. The mini-diode light-emitting board according to claim 1, wherein an orthographic projection of the luminance signal line onto the substrate and an orthographic projection of the control signal line onto the substrate do not overlap in regions other than an orthographic projection of the drive chip on the substrate.

11. The mini-diode light-emitting board according to claim 10, wherein the luminance signal line has a bridge connection through the drive chip at a region corresponding to the drive chip.

12. A light-emitting device, comprising a mini-diode light-emitting board, wherein,
   the mini-diode light-emitting board comprises: a substrate, a plurality of luminance signal lines on the substrate and a plurality of control signal lines on the substrate, wherein the plurality of luminance signal lines is arranged in a first direction and extends in a second direction, and the plurality of control signal lines arranged in the second direction and extends in the first direction;
   wherein the mini-diode light-emitting board comprises a plurality of sub-regions, and at least one of the plurality of sub-regions comprises a drive chip and a light-emitting diode (LED) light-emitting group;
   drive chips corresponding to a row of sub-regions which are arranged in the first direction are all electrically connected to the same control signal line, and drive chips corresponding to a column of sub-regions which are arranged in the second direction are all electrically connected to the same luminance signal line; wherein the drive chip is configured to obtain a luminance signal provided by the luminance signal line under the control of a control signal provided by the control signal line, and to control a corresponding LED light-emitting group to emit light according to the luminance signal;
   wherein at least one of the plurality of sub-regions comprises M LED light-emitting groups, and the drive chip comprises M control signal channels corresponding to the M LED light-emitting groups;

the M control signal channels of the same drive chip correspond to the same luminance signal line, the M control signal channels of the same drive chip correspond to different control signal lines, respectively, wherein M is a positive integer;

wherein the control signal channel comprises an AND gate circuit, input terminals of the AND gate circuit are connected to the control signal line and the luminance signal line, respectively, and an output terminal of the AND gate circuit is connected to a corresponding LED light-emitting group.

13. The light-emitting device according to claim 12, wherein at least one LED light-emitting groups comprise one LED-lamp bead or N LED connected in series, a first terminal of the LED light-emitting group is electrically connected to a corresponding drive chip, a second terminal of the LED light-emitting group is connected to a common power line, wherein N is an integer greater than 1.

14. The light-emitting device according to claim 13, wherein an orthographic projection of the common power line onto the substrate and an orthographic projection of the control signal line onto the substrate do not overlap.

15. The light-emitting device according to claim 14, wherein the common power line comprises a first sub-power line, a second sub-power line, and a common power bus; wherein, the first sub-power line extends in the second direction, and second terminals of LED light-emitting groups corresponding to the same sub-region are connected to the same first sub-power line;

the second sub-power line extends in the first direction, and first sub-power lines for the row of sub-regions arranged in the first direction are connected to the same second sub-power line; and the common power bus extends in the second direction, and each second sub-power line is connected to the common power bus.

16. The light-emitting device according to claim 15, wherein the second sub-power line is in bridge connection to corresponding portions of different sub-regions through the drive chip.

17. The light-emitting device according to claim 13, wherein an orthographic projection of the common power line onto the substrate and an orthographic projection of the luminance signal line onto the substrate do not overlap in regions other than an orthographic projection of the drive chip onto the substrate.

18. The light-emitting device according to claim 12, wherein an orthographic projection of the luminance signal line onto the substrate and an orthographic projection of the control signal line onto the substrate do not overlap in regions other than an orthographic projection of the drive chip on the substrate.

19. The light-emitting device according to claim 12, wherein m-th signal channels, in the drive chips corresponding to the row of sub-regions arranged in the first direction, correspond to the same control signal line, wherein m is a positive integer less than or equal to M.

20. The light-emitting device according to claim 12, wherein the drive chip comprises a digital-to-analog conversion module, the digital-to-analog conversion module is arranged between an end of the drive chip connecting to a corresponding luminance signal line and the input terminal of the AND gate circuit, and the digital-to-analog conversion module is configured to convert a luminance signal in a digital format inputted to the drive chip into a luminance signal in an analog format.

* * * * *